Oct. 23, 1951 G. H. SWART 2,572,215
BUSHING AND METHOD OF MAKING SAME
Filed April 9, 1945

INVENTOR
Gilbert H. Swart
BY Evans + McCoy
ATTORNEYS

Patented Oct. 23, 1951

2,572,215

UNITED STATES PATENT OFFICE 2,572,215

BUSHING AND METHOD OF MAKING SAME

Gilbert H. Swart, Akron, Ohio, assignor to The General Tire & Rubber Company, Akron, Ohio, a corporation of Ohio Application April 9, 1945, Serial No. 587,384

8 Claims. (Cl. 287—85)

This application is a continuation-in-part of my prior application Serial No. 480,345, filed March 24, 1943, now abandoned, and the invention relates to rubber articulated joints (including vibration absorbing mountings) of the type having two annularly spaced telescopically disposed sleeves or joint members in spaced coaxial relation and united by a rubber sleeve which is radially compressed or longitudinally tensioned throughout the mass thereof.

Torsional joints, vibration absorbing mountings, or pivotal connections having coaxial tubular metal members or sleeves, separated by a tubular mass of rubber, have heretofore been proposed. In one type of such joints, the rubber is interposed between the joint member under pressure in the uncured state and with the aid of a suitable rubber-to-metal adhesive bonded to both the inner and outer coaxial members of the joint during subsequent curing operations so that any movement between the inner and outer joint members is taken up by shear or deformation of the rubber. Such a torsional joint is not always desired for the reason that rubber, being cured or vulcanized in contact with the metal, is under no initial strain and the desirable properties and load-sustaining characteristics of rubber under compression are not therefore present in the joint.

Pivotal connections and torsional joints having coaxial members separated by rubber under a state of high compression have also been proposed. In the assembly of such rubber joints, a section of heavy-walled rubber tubing is usually forced through a tapered space into the space between the inner and outer members so as to compress and elongate the rubber into frictional engagement with each of the members. It has been considered almost essential in such a method of assembly to have a lubricant of some sort applied to the sliding surfaces. Because of the presence of a lubricant or because the coefficient of friction between rubber under compression and the joint members is insufficient to prevent it, there is a tendency for the joint members to slip relative to the rubber when the joint is subjected to high torsional strain. However, such torsional joints having rubber under compression have more desirable characteristics than those in which the rubber is simply molded in contact with and bonded to the joint members.

It is an object of the present invention to provide a rubber articulated joint between two substantially annularly spaced telescoping members in which the rubber or rubberlike material is under substantial radial compresison and longitudinal elongation, and in which the rubber is securely bonded to the coaxial metal members, so that the joint has the desirable characteristics of joints in which the rubber is molded in contact with and bonded to the metal members as well as those in which the rubber is under compression between the coaxial joint members.

It is another object to provide a rubber articulated joint between telescoping members in which the entire mass of rubber is under relatively uniform longitudinal tension due to radial compression and in which the rubber after deformation by radial compression is also bonded to at least one of the joint members throughout substantially its entire contact therewith, so that even under high torsional stress the relative movement between the inner and outer joints is entirely take up by deformation or shear in the rubber.

It is another object to provide a method of making rubber articulated joints having rubber under radial compression between telescoping metal sleeves and in which the rubber is bonded to the metal members throughout its entire length.

It is another object to provide a method of making the rubber articulated joints wherein a lubricant need not be used in assembly.

These and other advantages will be apparent from the following detailed description of the invention, as illustrated by the accompanying drawings, in which.

Figure 1:
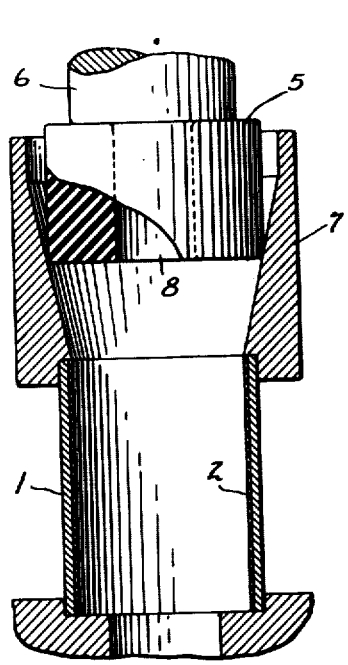
Figure 1 is a longitudinal view partly in section of apparatus and parts of a joint embodying the present invention showing the undeformed vulcanized tubular rubber section in position for incorporation within the outer sleeve of the joint.

In joints utilizing rubber under a state of high radial compression the generally accepted principles governing adhesion of rubber to metal by vulcanization in contact with adhesive do not necessarily apply. For example the assembly of joints with rubber under strong radial compression or axial elongation, especially those having the rubber compressed more than 30 or 40 per cent, is difficult without the use of a lubricant which has been generally considered as preventing bonding operations. Furthermore, direct bonding to metal has required prolonged treatment at elevated temperatures which tend to relieve stresses in the rubber member and eliminate advantages of joints having rubber under radial compression. The difficulty of direct bonding of rubber to metal in joints having rubber under high radial compression between two coaxial members is recognized in the Thiry British Patent 461,478 of 1937. In accordance with this patent the outer metal member was lined with a bonded layer of rubber compound vulcanized in situ. There was no bonding or joining of the separately vulcanized rubber of the resilient member directly and rigidly to the metal but mere cementing of this member to other separately vulcanized resilient rubber that was previously adhered to the metal in the ordinary way, i. e., by vulcanization in contact with a rubber-to-metal adhesive applied to the surface of the metal.

It has now been found that whether a film disposed between a metal surface and a separately vulcanized rubber or resilient member is capable of bonding rubber to metal or not, the mere heat softening and subsequent solidification of the film after assembly and under strong radial compression against said metal surface gives the effect of a bonded joint. The heat softenable or heat plastic film may be applied on either or both of the surfaces to be united or to contact. It gives, after only a heat softening and subsequent hardening of the resin in the assembled joint, marked advantages and permits the obtainment of joints with capacities several times those of joints of the same dimensions and with the same rubber but not having the resinous film at the rubber and metal interface. It is not required that a rubber to metal bond be formed as this term is used in the ordinary sense, as hard films that are thermoplastic or thermosetting generally may be used directly between the metal and separately vulcanized rubber to give advantages of greatly increased load carrying capacity.

It has also been further found that a chemically hardened surface on the resilient member and/or a hard resinous film on one or both surfaces to be united greatly facilitates assembly and permits assembly without a liquid lubricant. A liquid lubricant may, however, also be used and is desirable when the coefficient of sliding friction between the parts as treated just prior to assembly is more than .9. The lubricant should be one that leaves no residual lubricating film and which is absorbed into the rubber stock or resinous film.

The inner tubular surface of the outer rigid joint member and the outer surface of the inner metallic joint member are preferably each coated with a thermoplastic or thermosetting resin or composition having such a resin as a basic constituent. The composition may be an organic rubber-to-metal adhesive. The resin base coating is preferably allowed to dry or harden on the surface of the metal. The joint members are then placed in coaxial relationship with each other, with the rubber member radially compressed and elongated between the coaxial metallic members, and with the adhesive-coated surfaces of the inner and outer members in contact with the rubber. The entire joint, or preferably the metal members thereof alone, are then subjected to heat at a suitable temperature which usually is in a rubber vulcanizing range to cause bonding of the metal to the rubber over substantially the entire region of contact.

The surface of the separately cured rubber or resilient member may be hardened prior to assembly by any suitable treatment, as for example, by immersion into sulfur chloride, anhydrous hydrochloric acid, a solution of sulfuric acid, a solution of a halogen such as chlorine, a solution of an oxidizing agent, etc., or as above set forth by coating with a hard-drying coating composition, such as a solution or a dispersion of any resin which dries to a hard thermoplastic or thermosetting film. The production of a hard surface on the rubber usually reduces the coefficient of friction between the rubber and the metal members below .6 so that assembly is greatly facilitated.

The resinous film or films applied to the surfaces of one or preferably the metal members that are adapted to contact the resilient material, or to the surface of the resilient material, or to both the surfaces of the metal members and resilient material, may comprise as a basic constituent one or more natural or synthetic resins, such as the hard-setting organo-silicones (condensation polymers of silicon halides having one to three of the chlorine atoms thereof substituted by organic groups), thermoplastic and thermosetting resins. Examples of such resins are vinyl esters, such as polyvinyl chloride, copolymer of vinyl chloride and vinyl acetate, the polyacrylate resins including polymethyl methacrylate, and esters and amides of acrylic and chloracrylic acids, rubber addition products such as rubber chloride, polyvinyl acetal resins including polyvinyl butyral, phenol aldehyde and modified phenol aldehyde resins including polyvinyl butyral modified phenol formaldehyde resins, rubber modified phenolic resins, the condensation products such as the polyhydric alcohol esters of unsaturated acids and copolymers of these materials with esters of polybasic saturated or unsaturated acids with unsaturated alcohols, such as diallyl maleate, etc.

The resin may also be an organic rubber-to-metal adhesive. The time of heating need not be even nearly that required for normal bonding of unvulcanized rubber to metal. Such resinous materials, which are also rubber-to-metal adhesives, include cyclized rubber derivatives of rubber conversion products, such as the reaction products of rubber and amphoteric metal halides, isomerization products of rubber prepared by heating rubber in the presence of sulfuric or organic sulfonic acids, such as phenol sulfonic acids, including paratoluene sulfonic acid as well as the various salts of strong acids, modified rubber hydrochloride, rubber chloride, and the like. The preferred rubber-to-metal adhesives are those prepared by heating a mixture of rubber, a salt of a strong acid and a salt of a weak acid and water in a form having thin section to obtain an exothermic reaction product. These preferred adhesives are fully described in the Vance et al. Patent Number 2,379,939, filed September 4, 1942.

The resinous film as applied to the surface of the metal should be capable of being heat-softened or passed through the heat-softened state to obtain the benefits of the present invention. The resinous base may contain compounding agents including plasticizers, pigments and the like. It is found that in general hard-setting films adhere strongly to metal and have a relatively low coefficient of sliding friction during assembly of joint members so that they are most desirable for dry assembly (assembly without a lubricant). Films having a substantial amount of a modifying agent, such as rubber, and containing ingredients which maintain them in relatively tacky form, should ordinarily be assembled with the aid of a lubricating agent compatible with the film or compatible with the annulus so that it is capable of being absorbed by the resilient material.

Referring more particularly to the drawing, in which like parts are designated throughout the several views by like numerals of reference, the torsional joints of the present invention comprise an outer joint element with a sleeve portion 1, which is preferably tubular shaped, and which has over its inner cylindrical surface a coating 2 of a suitable thermoplastic resin or rubber-to-metal adhesive, as above described. An inner joint element 3, also having over its outer surface a layer of thermoplastic resin or rubber-to-metal adhesive 4, is disposed coaxially with the joint element 1 and is separated therefrom by the rubber or rubberlike material 5, which is under substantial radial compression and axial or longitudinal elongation. The rubber 5, with a volume that preferably does not exceed the volume between the members 1 and 3, is under substantial radial compression or longitudinal elongation, and is bonded throughout substantially its entire length to the elements 1 and 3 through the films of thermoplastic or rubber-to-metal adhesives 2 and 4 on the elements 1 and 3 respectively.

Figure 2:
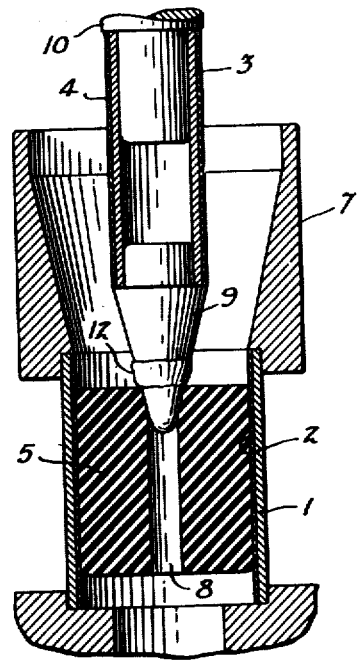
Fig. 2 is an elevational view partly in section of members of a joint embodying the present invention and a portion of apparatus suitable for assembly of the joint, showing the rubber element within the outer joint member and the inner coaxial joint element in a position for insertion within the tubular opening of the rubber element.
Figure 3:
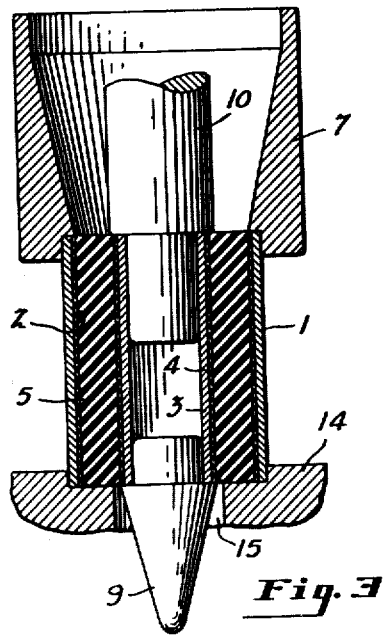
Fig. 3 is an elevational sectional view through the parts of a joint showing said parts in assembled position and showing a portion of the apparatus used in the assembly of the joint.
Figure 4:
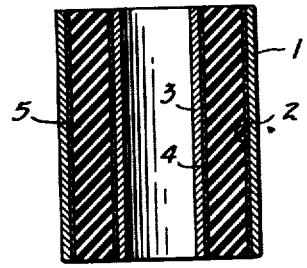
Fig. 4 is a longitudinal sectional view through a torsional joint embodying the present invention.

In the preparation of torsional joints embodying the present invention, the rubber annulus or tubular section 5, is prepared in vulcanized form having relatively thick walls. A section of suitable volume to substantially fill the space between the coaxial inner and outer sleeves or joint elements may be forced by downward movement of the plunger 6 through the tapered throat of the member 7 into the outer joint element 1, to a position such as that illustrated in Fig. 2 of the drawing. The unstretched rubber 5 is preferably larger in diameter than the internal diameter of the sleeve of the outer element 1, so that it is compressed and elongated substantially when it is forced into the outer element. After the rubber 5 is inserted in the outer element 1, the opening 8 has a considerably smaller diameter than the outer diameter of the cylindrical or sleeve portion 3 of the internal joint element.

To facilitate entry of the sleeve 3 through the opening 8 in the rubber, a tapered tip 9 is provided at the leading end of the sleeve 3, so that the inner joint element may be forced through the opening 8 in the rubber 5 by sudden movement of the plunger 10. The movement of the inner joint member to coaxial position within the outer joint element causes radial compression of the rubber annulus and its longitudinal elongation.

When the surfaces of the rubber member are not hardened as above set forth, a lubricant is usually desirable to facilitate movement of the sleeve 3 of the internal element through the relatively small opening 8 in the rubber member. The lubricant 12 may be placed on the leading end of the tapered member 9 so that it is distributed over the surface 4 of the film of rubber-to-metal adhesive on the inner joint member 3. The lubricant may be placed on one or both cylindrical surfaces of the rubber compound 5, or over the coated surfaces of the metallic joint elements if desired. The bed plate 14 of the press may have an opening 15 to receive a tip 9 as the internal inner and outer elements are brought into coaxial relation by relative movement of the piston or plunger and the plate 14.

After the assembly of the joint elements, the entire assembly or the metal thereof may be heated at elevated temperatures for a suitable period to cause bonding of the rubber 5 to the inner and outer metallic elements. In order to decrease adverse effects on the rubber or rubberlike material 5, it is preferred that the heating of the elements 1 and 3 be accomplished rapidly, say around 1 to 5 minutes, or preferably less, at a temperature sufficiently high to cause melting or heat softening of the resin base film but which is non-destructive to the rubbery or resinous materials. In such cases heat transfer to the softenable interfaced film is primarily through the metal members. Heating by passage of electric current or magnetic flux through the metal portions in contact with the rubber is especially desirable.

The preferred lubricants are dependent to some extent upon the absorption characteristics of the rubber or rubberlike material. They should have low frictional properties and be entirely absorbed in the rubber without leaving a residue. For example, if the annular rubber member 5 is composed primarily of a natural rubber compound or of a Buna-S type rubber compound and a very high radial compression in the rubber member is had, petrolatum or mineral oil which is free from solid paraffins and amorphous waxes may be used. For Buna-N types of rubber compounds, special plasticizers such as oleic acid or other higher fatty acids which are liquid at the temperature of the parts being assembled, or which are dissolved in a solvent compatible with the Buna N are satisfactory. Generally, the lubricant may be a high boiling ester or any oily plasticizer for the rubber or rubbery polymer comprising the major portion of the rubber material in the element 5, i. e., the lubricant and rubber should be compatible so that absorption takes place. Rubber cements, solutions of rubbery polymer, or preferably mixtures of such cements or dilute solutions with an oil or oily plasticizer, petrolatum, etc. are often especially desirable as the lubricant in preparing joints of the present invention.

In the preparation of the preferred joints of the present invention, the annular resilient member 5, such as a member of rubber, a sulfur-vulcanizable synthetic rubber, neoprene, or any material vulcanized to the resilient state characteristic of soft vulcanized rubber, is treated as above noted with a surface hardening material, such for example as an aqueous halogen solution, sulfur chloride, anhydrous hydrogen chloride gas, etc., or relatively hard film forming solution or dispersion, such as a solution or dispersion of a heat softenable thermoplastic or thermosetting resin capable of forming a film which adheres to the rubbery compound. The film on the resilient material and metal surprisingly need not be compatible (i. e., miscible in the softened state) with each other to obtain benefits after the heat softening treatment after assembly.

After the assembly of the hardened annular rubber element between the coated surfaces of the sleeve portion 1 of the outer joint element and the outer surface of the inner joint element 3, substantial bonding of the metal and rubber through a film of a thermosetting or thermoplastic resin is readily obtained by simply heating the joint or preferably primarily the metal members thereof to cause the resinous or rubber-to-metal adhesive coating to become plastic or to pass through the plastic state. Upon cooling of the joints containing thermoplastic resins or by curing of the thermosetting type, rigid bonding of the hardened surface of the rubber or rubbery material and the metal is had.

In accordance with a modification of the present invention, a film of one of the above resins may be applied between the rubber and metal elements of the joint by utilizing a solution or dispersion of one of the above thermoplastic or thermosetting resins as a lubricating agent during assembly of the joint elements. A relatively viscous or oily solution of a resinous material and non-volatile solvent capable of being absorbed by or dissipated thru the rubber composition is particularly desirable as a combined lubricating and film-forming agent. This is especially the case when the resinous composition contains a rubbery polymeric material such as a rubbery polyvinylacetal resin or a natural or synthetic rubber partly copolymerized with or added to thermoplastic or thermosetting resin or resin forming constituents. When a solution of a resinous material is utilized as a lubricant or when any lubricant is used in the preparation of joints or mountings embodying the present invention, it is preferred to apply the heat treatment after the elapse of sufficient time to allow dissipation of the solvent or liquid constituents of the lubricant into or thru the rubbery member with consequent setting of the film. Generally, an elapsed time of from one or two days to two or three weeks between the assembly of the joint members and the application of the heat treatment to cause softening of the film is sufficient.

The advantages of the present invention are obtained in joints of all types having the rubber under static radial pressure between coaxial metal or rigid members, including those types wherein the rubber is maintained in an axially elongated state by radial pressure against the rigid members and those joints wherein the rubberlike member is maintained under a state of static radial pressure by axial compression of the rubber member to tend to expand radially against the resilient members.

The metal members may be provided with a roughened or sandblasted surface, a "Parkerized" surface (produced by successive treatment of clean metal with a phosphate or phosphoric acid, a water rinse and a chromic acid rinse) and an anodized surface in the case of aluminum, etc. Although not necessary with the rubber-to-metal adhesives as set forth above, the inner surface of the outer coaxial element I and the outer surface of the inner element 3 may be roughened or preferably brass-plated or given a copper flash coating prior to coating with the cement or adhesive.

By utilizing films of a resinous material in the interface between the separately vulcanized resilient member and the coaxial members, which films pass through the plastic stage after assembly of the coaxial members of the joint, the joints produced are capable of carrying loads under relatively high deflection. Prior to the present invention, joints utilizing rubber under compression were generally designed for maximum deflection under vibrational load of only a few tenths of an inch. A relatively large stiff joint or mounting necessarily had to be used to maintain the deflection within these limits. With mountings or joints of the present invention a deflection several times the deflection causing rupture or slippage of prior art joints may be used.

It is well known that vibration insulation of a mounting is controlled by the natural frequency of the mounted system and that the vibration insulation is greater when the natural frequency of the system is less. Since the greater the normal deflection of the mounted system, the lower the natural frequency, it is readily seen that the mountings of the present invention by permitting the use of large deflections many times those of mountings of the same type heretofore produced, permit greater efficiency and vibration insulation and also permit the use of a much smaller mounting than was heretofore feasible in commercial applications.

Furthermore, it is to be understood that the particular form of product shown and described, and the particular procedure set forth, are presented for purposes of explanation and illustration and that various modifications of said product and procedure can be made without departing from my invention as defined in the appended claims. In the claims the term "joint" is used in the generic sense to include vibration absorbing mountings.

The term "resin" is used herein in its recognized sense. As defined in "The Chemistry of Synthetic Resins" by Carleton Ellis, volume 1, published by the Reinhold Publishing Corporation in 1935, page 11, "A resin may be defined as a solid or semi-solid, complex, amorphous mixture of organic substances, having no definite melting point and showing no tendency to crystallize. A resin is characterized by such physical properties as a typical luster and a conchoidal fracture rather than by any definite chemical composition."

What I claim is:

1. A mounting or joint having an outer rigid member with a generally tubular portion, an inner rigid member with a generally cylindrical portion in substantially coaxial relation within said tubular portion, a separately cured intervening annulus of a rubber compound separating said portions, said annulus being maintained under substantial radial compression and axial elongation by said portions, a solid film comprising a rigid resin as a basic ingredient between at least one of said portions and said annulus, a surface of said annulus being rigidly and directly connected through said film to said last named portion, said resin film after being in a softened state uniting said annulus to the inner member upon change from the softened to the hardened state, said mounting or joint being further characterized by having a greater resistance to slippage than has a joint or mounting of identical size and composition but without said film.

2. A mounting or joint having an outer rigid member with a generally tubular portion, an inner rigid member with a generally cylindrical portion in substantially coaxial relation within said tubular portion, a separately cured intervening annulus of a rubber compound separating said portions, said annulus being maintained under substantial radial compression and axial elongation by said portions, and a film comprising a rigid resin as a basic ingredient between each of said portions and said annulus, said film and directly rigidly after having been in a softened state uniting a surface of said separately cured annulus to one of said portions by subsequent change from the softened to the rigid state.

3. A mounting or joint having an outer rigid member with a generally tubular portion, an inner rigid member with a generally cylindrical portion in substantially coaxial relation within said tubular portion, a separately cured intervening annulus of a rubber compound separating said portions, said annulus being maintained under substantial radial compression and axial elongation by said portions, a hard thermoplastic film comprising rigid resin as a basic ingredient between at least one of said portions and said annulus, a surface of said annulus being rigidly and directly connected through said film to said portion upon change from a softened to a hardened state after assembly, said mounting or joint being further characterized by having a greater resistance to slippage than has a joint or mounting of identical size and composition but without said film.

4. A mounting or joint having an outer rigid member with a generally tubular portion, an inner rigid member with a generally cylindrical portion in substantially coaxial relation within said tubular portion, a separately cured intervening annulus of a rubber compound separating said portions, said annulus being maintained under substantial radial compression and axial elongation by said portions, a hard non-thermoplastic film comprising resinous material as a basic ingredient between at least one of said portions and said annulus, a surface of said annulus being rigidly and directly connected through said film to said portion, said film being one converted from the plastic to the nonthermoplastic state after assembly, said mounting or joint being further characterized by having a greater resistance to slippage than has a joint or mounting of identical size and composition but without said film.

5. In a method of making pivotal connections having inner and outer metallic elements, with the inner element substantially concentric with portions of the outer element and separated therefrom by an annulus of a rubber compound under relatively high radial compression and axial elongation, the steps which comprise coating substantial proportions of the inner surface of the outer element with a thermoplastic resin composition, coating substantial proportions of the outer surface of said inner element with a thermoplastic resin base composition, assembling said elements in concentric relation while simultaneously radially compressing said annulus of a cured rubber compound interposed between the outer surface of said inner element and the inner surface of said outer element, and thereafter selectively subjecting said metal elements to heat to cause softening of said thermoplastic material without relief of compressive strains in said annulus, whereby a bond between said annulus and said inner and outer elements is obtained.

6. In a method of making pivotal connections having inner and outer metallic elements, with the inner element substantially concentric with portions of the outer element and separated therefrom by an annulus of a rubber compound under relatively high radial compression and axial elongation, the steps which compromise coating the outer surface of said inner element with a thermoplastic resin base composition, assembling said elements in concentric relation while simultaneously radially compressing said annulus of cured rubber compound interposed between the outer surface of said inner element and the inner surface of said outer element, and thereafter subjecting said inner element to the action of a strong electric current for a sufficiently short period of time to selectively heat it without causing relief of strain in said rubber annulus.

7. In a method of making rubber articulated joints having an outer rigid element with a generally cylindrical inner tubular surface and an inner rigid element having a generally cylindrical outer surface arranged substantially concentric with said inner cylindrical surface of said outer element and separated by an annulus of a cured rubber compound under relatively high radial compression, the steps which comprise disposing a film of a composition having a base of solid resin on at least one of the mutually contacting surfaces of said rigid member and said annulus, assembling said rigid elements in concentric relation while simultaneously radially compressing said annulus between the outer surface of the inner element and the inner surface of said outer element, and thereafter causing said film to solidify while maintaining radially compressive stress in said annulus, said joints after assembly being subjected to heat for insufficient time to cause relief of stress in said annulus.

8. In a method of making rubber articulated joints having an outer rigid element with a generally cylindrical inner tubular surface and an inner rigid element having a generally cylindrical outer rigid surface arranged substantially concentric with said inner cylindrical surface of said outer element and separated by an annulus of a cured rubber compound under radial compression, wherein said annulus is compressed and radially elongated between said rigid elements as they are telescoped into concentric relation, one with the other, the steps which comprise wetting the surfaces of said annulus adapted to bear against said inner element with a solution of a resin in a solvent that is compatible with the rubber compound so that said solution is in contact with an outer rigid surface on said inner member during the subsequent telescoping step, and thereafter telescoping said rigid elements into concentric relation one within the other and simultaneously compressing and radially elongating said annulus therebetween, whereby said solvent and liquid constituents of said solution may be absorbed in the rubber annulus with consequent formation of a solid rigid resinous film between said annulus and said rigid elements, whereby said annulus is more integrally connected to said rigid elements, said joints after assembly being subjected to heat for an insufficient time to cause relief of stress in said annulus.

GILBERT H. SWART.

REFERENCES CITED

The following references are of record in the file of this patent:

UNITED STATES PATENTS

| Number | Name | Date |
| --- | --- | --- |
| 2,021,371 | Manchester | Nov. 19, 1935 |
| 2,078,910 | Merrill | Apr. 27, 1937 |
| 2,087,480 | Pitman | July 20, 1937 |
| 2,117,046 | Welker | May 10, 1938 |
| 2,128,635 | Charch | Aug. 30, 1938 |
| 2,367,033 | Lear | Jan. 9, 1945 |
| 2,378,801 | Sidell et al. | June 19, 1945 |
| 2,423,922 | Arndt | July 15, 1947 |
| 2,433,911 | Johnston | Jan. 6, 1948 |

FOREIGN PATENTS

| Number | Country | Date |
| --- | --- | --- |
| 461,478 | Great Britain | Feb. 17, 1937 |

Certificate of Correction

Patent No. 2,572,215                                                   October 23, 1951

GILBERT H. SWART

It is hereby certified that error appears in the printed specification of the above numbered patent requiring correction as follows:

Column 8, lines 70 and 71, strike out "and directly rigidly after having been in a softened state" and insert instead *after having been in a softened state rigidly and directly*;

and that the said Letters Patent should be read as corrected above, so that the same may conform to the record of the case in the Patent Office.

Signed and sealed this 26th day of February, A. D. 1952.

[SEAL]

THOMAS F. MURPHY,
*Assistant Commissioner of Patents.*